US007600041B2

(12) United States Patent
Gandar

(10) Patent No.: US 7,600,041 B2
(45) Date of Patent: Oct. 6, 2009

(54) INDUSTRIAL OR DOMESTIC LOCAL NETWORK

(75) Inventor: Marc Gandar, Plan les Ouates (FR)

(73) Assignee: MediaFlow, Inc., Portland, OR (US)

( * ) Notice: Subject to any disclaimer, the term of this patent is extended or adjusted under 35 U.S.C. 154(b) by 781 days.

(21) Appl. No.: 10/698,610

(22) Filed: Oct. 31, 2003

(65) Prior Publication Data

US 2004/0148418 A1    Jul. 29, 2004

(30) Foreign Application Priority Data

Oct. 31, 2002    (FR)    ................................. 02 13695

(51) Int. Cl.
*G06F 15/16*    (2006.01)
(52) U.S. Cl. ................... 709/245; 709/236; 709/237; 711/202; 370/465; 370/466
(58) Field of Classification Search ................ 709/236, 709/237, 245; 711/202; 370/465, 466
See application file for complete search history.

(56) References Cited

U.S. PATENT DOCUMENTS

| 5,214,644 | A | * | 5/1993 | Ikezaki | ....................... 711/100 |
| 5,278,848 | A | * | 1/1994 | Yamaguchi | ................ 714/800 |
| 5,510,775 | A | * | 4/1996 | Loncle | .......................... 710/9 |
| 5,513,324 | A | * | 4/1996 | Dolin et al. | ................ 709/237 |
| 5,544,158 | A | * | 8/1996 | Oprea et al. | ................ 370/438 |
| 5,608,730 | A | * | 3/1997 | Osakabe et al. | ............ 370/471 |
| 5,666,363 | A | * | 9/1997 | Osakabe et al. | ............ 370/426 |
| 5,754,531 | A | * | 5/1998 | Okamoto | .................... 370/249 |
| 5,826,038 | A | * | 10/1998 | Nakazumi | .................... 709/251 |
| 5,930,520 | A | * | 7/1999 | Ando | ......................... 712/23 |
| 6,081,845 | A | * | 6/2000 | Kanemaki et al. | ........... 709/238 |
| 6,112,230 | A | * | 8/2000 | Monch et al. | ................ 709/208 |
| 6,310,876 | B1 | * | 10/2001 | Egbert | ........................ 370/389 |
| 6,397,324 | B1 | * | 5/2002 | Barry et al. | .................. 712/225 |
| 6,628,649 | B1 | * | 9/2003 | Raj et al. | ..................... 370/360 |
| 6,842,454 | B2 | * | 1/2005 | Metcalf, III | ................. 370/392 |
| 7,089,333 | B2 | * | 8/2006 | Marinescu et al. | .......... 709/248 |
| RE39,317 | E | * | 10/2006 | Sakagawa | .............. 370/395.54 |
| 7,143,187 | B1 | * | 11/2006 | Takeda et al. | ............... 709/245 |
| 7,295,552 | B1 | * | 11/2007 | Kadambi et al. | ............ 370/392 |

(Continued)

OTHER PUBLICATIONS

Memory Address, Wikipedia, pp. 1-7.*

(Continued)

*Primary Examiner*—John Follansbee
*Assistant Examiner*—Backhean Tiv
(74) *Attorney, Agent, or Firm*—Lando & Anastasi, LLP

(57) ABSTRACT

The exchange of frames over a network between devices. Each device comprises a communication circuit connected to a processing unit and comprises addresses, each one being associated with a transmission or reception indicator, a single device comprising a same address associated with a transmission indicator. Each address is associated with a memory containing a frame. A master device periodically transmits transmission indicator addresses. The communication circuit of the device for which the transmitted address is associated with a transmission indicator transmits the frame of the memory to said address and provide the processing unit with an identifier of said address. Each communication circuit of a device for which the transmitted address is associated with a reception indicator writes said frame into the memory at said address and provides the processing unit with an identifier of said address.

6 Claims, 2 Drawing Sheets

U.S. PATENT DOCUMENTS

| | | | |
|---|---|---|---|
| 2001/0003526 A1* | 6/2001 | Kanehara | 370/465 |
| 2001/0009017 A1* | 7/2001 | Biliris et al. | 709/245 |
| 2001/0056499 A1* | 12/2001 | Shirai et al. | 709/245 |
| 2002/0013858 A1* | 1/2002 | Anderson | 709/245 |
| 2002/0026523 A1* | 2/2002 | Mallory et al. | 709/236 |
| 2002/0029286 A1* | 3/2002 | Gioquindo et al. | 709/236 |
| 2002/0035658 A1* | 3/2002 | Whetsel | 710/300 |
| 2002/0169886 A1* | 11/2002 | Saito et al. | 709/230 |
| 2003/0031208 A1* | 2/2003 | Anehem et al. | 370/474 |
| 2003/0050989 A1* | 3/2003 | Marinescu et al. | 709/208 |
| 2003/0056008 A1* | 3/2003 | Russell et al. | 709/245 |
| 2003/0069993 A1* | 4/2003 | Na et al. | 709/245 |
| 2006/0023743 A1* | 2/2006 | Brown et al. | 370/466 |

OTHER PUBLICATIONS

Memory data register, Wikipedia, pp. 1-2.*
Memory address register, Wikipedia, pp. 1-2.*
Grandar, Mark et al.: "A Low Cost Multimedia Tool for Telemedicine Network Rapid Design" Multimedia Signal Processing, 1997. IEEE First Workshop On Princeton, NJ USA Jun. 23-25, 1997, New York, NY, USA , pp. 525-530, XP010233876.

* cited by examiner

INDUSTRIAL OR DOMESTIC LOCAL NETWORK

BACKGROUND OF THE INVENTION

1. Field of the Invention

The present invention relates to a local network of industrial or domestic type intended for the control and/or the supervision of various appliances by means of one or several distributed (or delocalized) computers.

2. Discussion of the Related Art

FIG. 1 very schematically illustrates the architecture of an industrial or domestic network. Network N enables connection of several devices, three devices $D_1$, $D_2$, $D_3$ being shown in FIG. 1. Each device is for example formed of a computer, of an actuator controlled by a microprocessor or of a sensor connected to a microprocessor. Each device $D_1$, $D_2$, $D_3$ comprises an application system $A_1$, $A_2$, $A_3$ and a communication circuit $C_1$, $C_2$, $C_3$. Communication circuit $C_1$, $C_2$, $C_3$ may comprise a microprocessor or a programmable logic and ensures the reception and the transmission of information frames over network N. Application system $A_1$, $A_2$, $A_3$ comprises a microprocessor or a programmable logic which, under control of a program that may be modified by a user, processes the information frames transmitted and received by communication circuit $C_1$, $C_2$, $C_3$. Application system $A_1$, $A_2$, $A_3$ may further be connected to actuators or sensors. Application system $A_1$, $A_2$, $A_3$ and communication circuit $C_1$, $C_2$, $C_3$ may be formed by separate integrated circuits connected by wire links W.

Generally, application system $A_1$, $A_2$, $A_3$ sets up the information frames sent to communication circuit $C_1$, $C_2$, $C_3$ according to operating parameters of network N so that they can be properly transmitted over network N by communication circuit $C_1$, $C_2$, $C_3$. The network operating parameters are the set of parameters which define the data flows over the network, the priorities between the devices connected to the network, the shape of the information frames transmitted over the network, etc. The information frames may also be directly set up by communication circuit $C_1$, $C_2$, $C_3$ according to the network operating parameters which are set by application system $A_1$, $A_2$, $A_3$ and which can be modified by it.

A disadvantage is that by modifying the elements forming application system $A_1$, $A_2$, $A_3$ of a device $D_1$, $D_2$, $D_3$ connected to network N, for example, by modifying the program executed by the microprocessor of application system $A_1$, $A_2$, $A_3$, it is possible to modify the network operating parameters used by device $D_1$, $D_2$, $D_3$ and thus to alter, or even to interrupt the operation of network N. It may then be difficult to find out the origin of the anomaly and to correct it, and the network may be definitely deteriorated. Similarly, when a new device is connected to network N, it is assumed that the application system of the new device has network operating parameters which are adapted to the network N to which the device is connected. In the case where such parameters are incorrect, the new device connected to network N can alter, or even interrupt, the general operation of network N.

SUMMARY OF THE INVENTION

The present invention aims at a secure exchange of information frames over a local network which limits risks of alteration of the network operation by one of the devices connected to the network.

For this purpose, it provides a method for exchanging information frames over a network between devices, each device comprising a communication circuit connected to a processing unit and comprising addresses, each address being associated with a transmission or reception indicator, a single device comprising a same address associated with a transmission indicator, in which each address is associated with a memory containing an information frame that can be modified and/or read by the processing unit, and comprising the steps of having a master device periodically transmit addresses; having the communication circuit of the device for which the address transmitted by the master device is associated with a transmission indicator transmit the information frame contained in the memory associated with said address and provide the processing unit with an identifier of said address; and having each communication circuit of a device for which the address transmitted by the master device is associated with a reception indicator write into the memory associated with said address of said information frame and provide the processing unit with an identifier of said address.

According to an embodiment of the present invention, the processing units, except for the processing unit of the master device, can neither read nor modify the addresses and the transmission and/or reception indicators of the communication circuits to which they are connected.

According to an embodiment of the present invention, all communication circuits further comprise a first address identical for all devices and associated with a transmission indicator and a second address identical for all devices and associated with a reception indicator, the connection of a new device to the network comprising the steps of having the master device periodically transmit the first address; having the communication circuit of the new device, upon reception of the first address, transmit an identification frame; having the master device successively transmit the second address and a parameterizing frame defined based on the identification frame; having the communication circuit of the new device, upon successive reception of the second address and of the parameterizing frame, modify its addresses and reception and/or transmission indicators based on the parameterizing frame.

According to an embodiment of the present invention, each device comprises a specific identification number stored in the communication circuit, the identification frame transmitted by the communication circuit of the new device comprising the specific identification number of said new device, the parameterizing frame transmitted by the master device comprising the specific identification number of said new device.

According to an embodiment of the present invention, the communication circuit of the new device transmits no data as long as it has not received the first address.

According to an embodiment of the present invention, the communication circuit of each device comprises a privilege indicator at a first value when the device is likely to transmit addresses over the network and at a second value otherwise, said privilege indicator being set to the first or to the second value by the communication circuit of the new device based on the parameterizing frame.

The present invention also provides a device intended to be connected to a network comprising a communication circuit and connected to a processing unit, comprising an address table, a register table, each register in the register table being associated with an address in the address table and a direction table comprising one direction indicator per address, said processing unit being capable of reading information frames stored in the registers or writing information frames into the registers, said communication circuit being capable, upon reception of a request received from the network and corresponding to one of said addresses, of transmitting over the network the information frame stored in the register associated with said address if the corresponding direction indicator is of a first determined type, or of writing an information frame received from the network into the register associated with said address if the corresponding direction indicator is of a second determined type, and being capable of transmitting to the processing unit an identifier of the register associated with said address.

According to an embodiment of the present invention, the address table comprises a first address identical for all the devices connected to the network, the direction table comprising a direction indicator associated with said first address of the first type, the communication circuit of the device being adapted to transmitting said addresses and the associated direction indicators over the network upon reception of said first address.

According to an embodiment of the present invention, the address table comprises a second address identical for all circuits connected to the network, the direction table comprising a direction indicator associated with said second address of the second type, and being capable, upon successive reception of the second address and of a parameterizing frame, of modifying the addresses and the associated direction indicators based on the parameterizing frame.

The foregoing object, features, and advantages of the present invention will be discussed in detail in the following non-limiting description of specific embodiments in connection with the accompanying drawings.

DETAILED DESCRIPTION

The present invention consists, for most devices connected to the network and called slave devices, of limiting the data likely to be exchanged between the application system and the communication system of the device, so that the application system has no access to the network operating parameters used by the communication circuit to exchange information frames over the network. The application system of a slave device thus cannot modify the network operating parameters, whatever the modifications brought to the application system, for example at the level of the program executed by the application system's microprocessor. A single device connected to the network and called the master device has the ability to modify the network operating parameters used by the slave devices.

Figure 1:
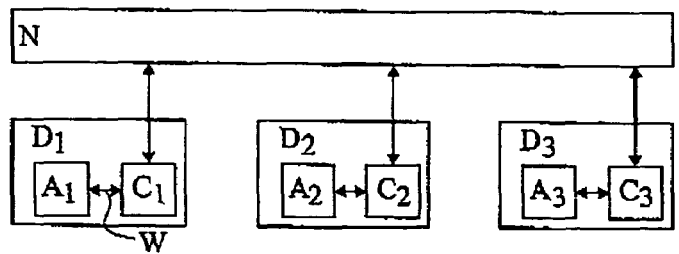
FIG. 1 previously described, illustrates an example of a conventional local network.
Figure 2:
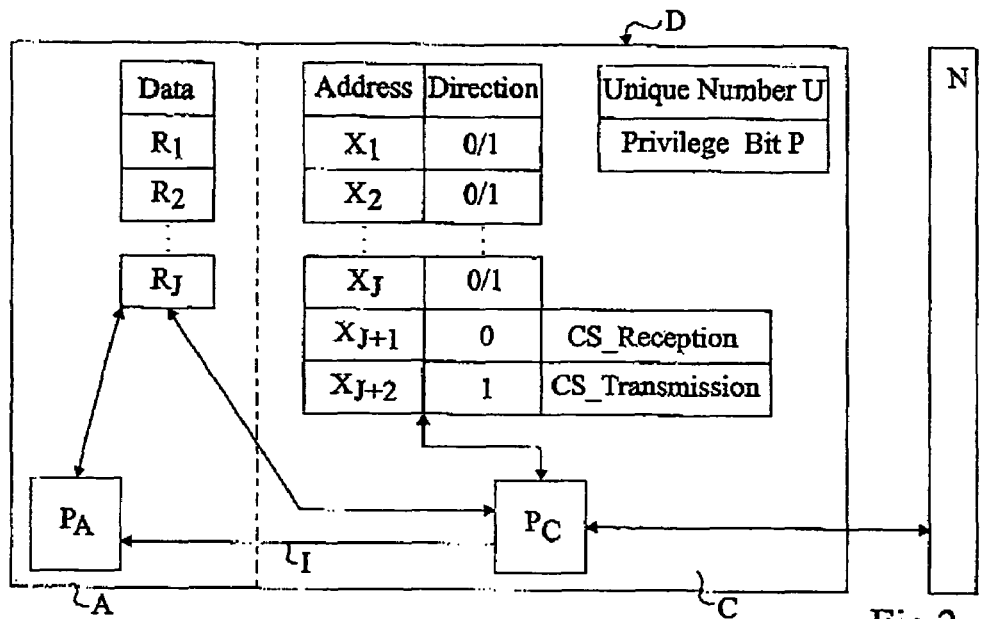
FIG. 2 shows the characteristic operating parameters used by a slave device according to the present invention connected to the network.

FIG. 2 shows an example of the forming of a slave device D according to the present invention comprising an application system A connected to a communication circuit C, communication circuit C being capable of exchanging information frames over a network N. According to the type of network N, devices D may all be connected to a bus or be interconnected by point-to-point links. Communication circuit C comprises a communication unit $P_C$ capable of exchanging information frames with network N according to parameters stored in memories. Application system A comprises a processing unit $P_A$ capable of receiving data provided by communication unit $P_C$ and of processing data stored in a memory, for example, by executing a program.

Communication circuit C comprises an address table (Address) in which are stored addresses $X_1$ to $X_{J+2}$, where J is the number of simultaneous communication channels that a device D may have with other devices connected to network N. Each address $X_1$ to $X_J$ is associated with a single communication channel. Value J varies according to the type of device D connected to network N. The address table may comprise only certain addresses from among addresses $X_1$ to $X_J$ and the cells of the address table unused by device D are placed at an arbitrary inhibition value. Addresses $X_{J+1}$ and $X_{J+2}$ are always present for all devices D connected to network N. Addresses $X_1$ to $X_{J+2}$ may correspond to binary data, for example, of 16 bits. To address $X_{J+1}$ corresponds a specific information frame, called the parameterizing frame (CS_Reception), which is stored at the level of communication channel C. To address $X_{J+2}$ corresponds a specific information frame called the identification frame (CS_Transmission), stored at the level of the communication circuit. The communication circuit also comprises a direction table (Direction) in which are stored direction indicators, each direction indicator corresponding to a single bit. Each address $X_1$ to $X_{J+2}$ is associated with a direction indicator which is at 1 or at 0 for addresses $X_1$ to $X_J$, at 0 for address $X_{J+1}$ and at 1 for address $X_{J+2}$. For a given address $X_1$ to $X_J$, a single device of the network comprises a direction indicator associated with said address at 1. An identification number U (Unique Number U), specific to each device D likely to be connected to network N, and a privilege indicator (Privilege Bit P) are stored in a memory of communication circuit C. As an example, specific identification number U comprises 63 bits and the privilege indicator comprises a single bit.

Application system A comprises a table (Data) of registers $R_1$ or $R_J$ in which are stored data that can be of variable size, each register $R_1$ to $R_J$ being associated with an address $X_1$ to $X_J$ in the address table.

The data stored in registers $R_1$ to $R_J$ may be read or modified by communication unit $P_C$ of communication circuit C and by processing unit $P_A$ of application system A. Communication unit $P_C$ may, under certain conditions, modify the different addresses $X_1$ to $X_J$, the direction indicators, and privilege indicator P. Processing unit $P_A$ can neither read, nor modify addresses $X_1$ to $X_J$, the direction indicators, and privilege indicator P. Specific identification number U is a characteristic of device D and can be modified neither by communication unit $P_C$ nor by processing unit $P_A$. Similarly, addresses $X_{J+1}$ and $X_{J+2}$ are characteristics of device D and can be modified neither by communication unit $P_C$, nor by processing unit $P_A$. Communication unit $P_C$ is adapted to transmitting to processing unit $P_A$ an identifier I indicating one of registers $R_1$ to $R_J$ of the register table.

Figure 3:
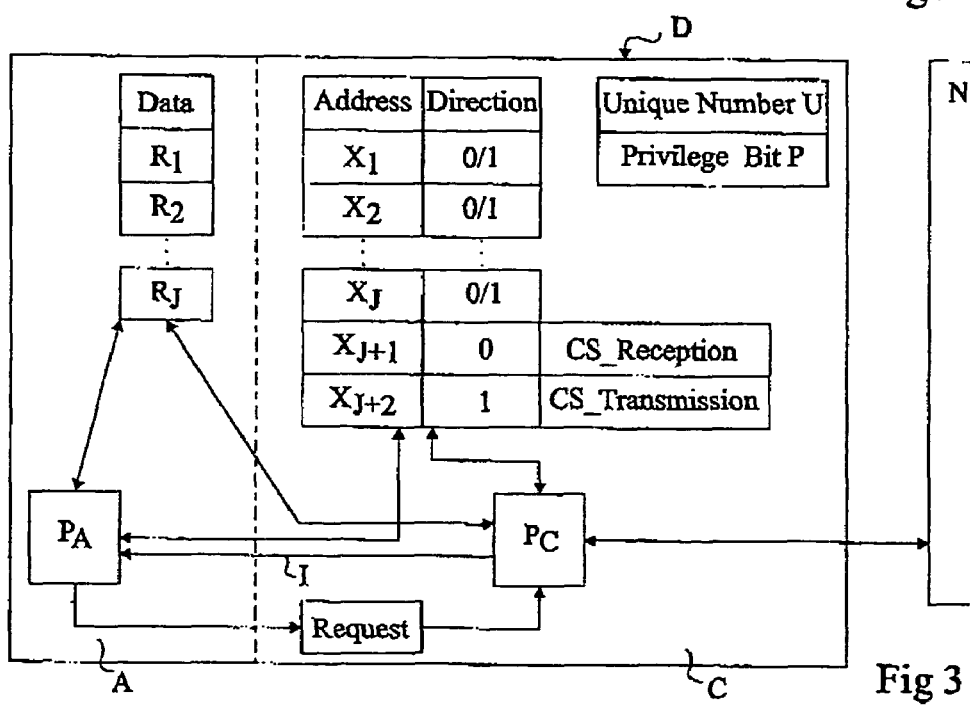
FIG. 3 shows the characteristic operating parameters used by a master device according to the present invention connected to the network.

FIG. 3 shows the structure of master device M, which is similar to that shown in FIG. 2. However, conversely to all slave devices, processing unit $P_A$ of application system A of master device M can directly modify the address and direction tables stored at the level of the communication circuit C of master device M. Communication circuit C further comprises a register (Request) where requests Q to be transmitted over network N are successively written by application system A.

The method according to the present invention of information frame exchange over network N is the following. At a given time, only master device M has the possibility to transmit requests Q over network N. Requests Q are received by all the slave devices D connected to network N. Based on a received request Q, each communication unit $P_C$ may determine a same address $X_K$ from among addresses $X_1$ to $X_{J+2}$. In particular, request Q may be equal to address $X_K$.

For each slave device, if address $X_K$ determined based on a received request corresponds to one of stored addresses $X_1$ to $X_J$, communication unit $P_C$ determines whether the direction indicator associated with address $X_K$ is at 0 or at 1.

If the direction indicator is at 1, communication unit $P_C$ reads the information frame stored in the data register $R_K$ associated with address $X_K$ and transmits it over network N. Communication unit $P_C$ then sends to processing unit $P_A$ the identifier I associated with the register $R_K$ which has been read from, to indicate thereto that the information frame stored in register $R_K$ has been transmitted over network N.

If the direction indicator associated with address $X_K$ is at 0, communication circuit C waits to receive an information frame from network N. According to the exchange protocol used by the network, the expected information frame may correspond to the first information frame received by device D after reception of the request or to a subsequent frame. Communication unit $P_C$ then memorizes the received information frame in the data register $R_K$ associated with address $X_K$, then transmits to processing unit $P_A$ the identifier I associated with register $R_K$ to notify application system A that a new information frame has been stored in the register $R_K$ corresponding to identifier I.

Master device M can also transmit information frames over the network. Indeed, upon transmission of a request Q by master device M, master device M, like the slave devices, receives request Q that it has just transmitted. It is then enough for the direction indicator associated with the address of the transmitted request to be at 1 for master device M to then transmit the information frame stored in the data register associated with the request address.

According to the address and direction tables of the devices connected to the network, data flows may then be established between devices. The address and direction tables thus form the network operating parameters according to the present invention.

For the slave devices connected to the network, processing unit $P_A$ of application system A of each slave device has access neither to the address and direction tables, nor to the privilege indicator of communication circuit C. The application system thus cannot modify the network operating parameters and thus disturb the operation of network N. Only the processing unit of the application system of the master device can directly modify the tables stored in the communication circuit of the master device. However, the operation of the master device being generally well known, the cause of a malfunction of the network can easily be diagnosed.

Figure 4:
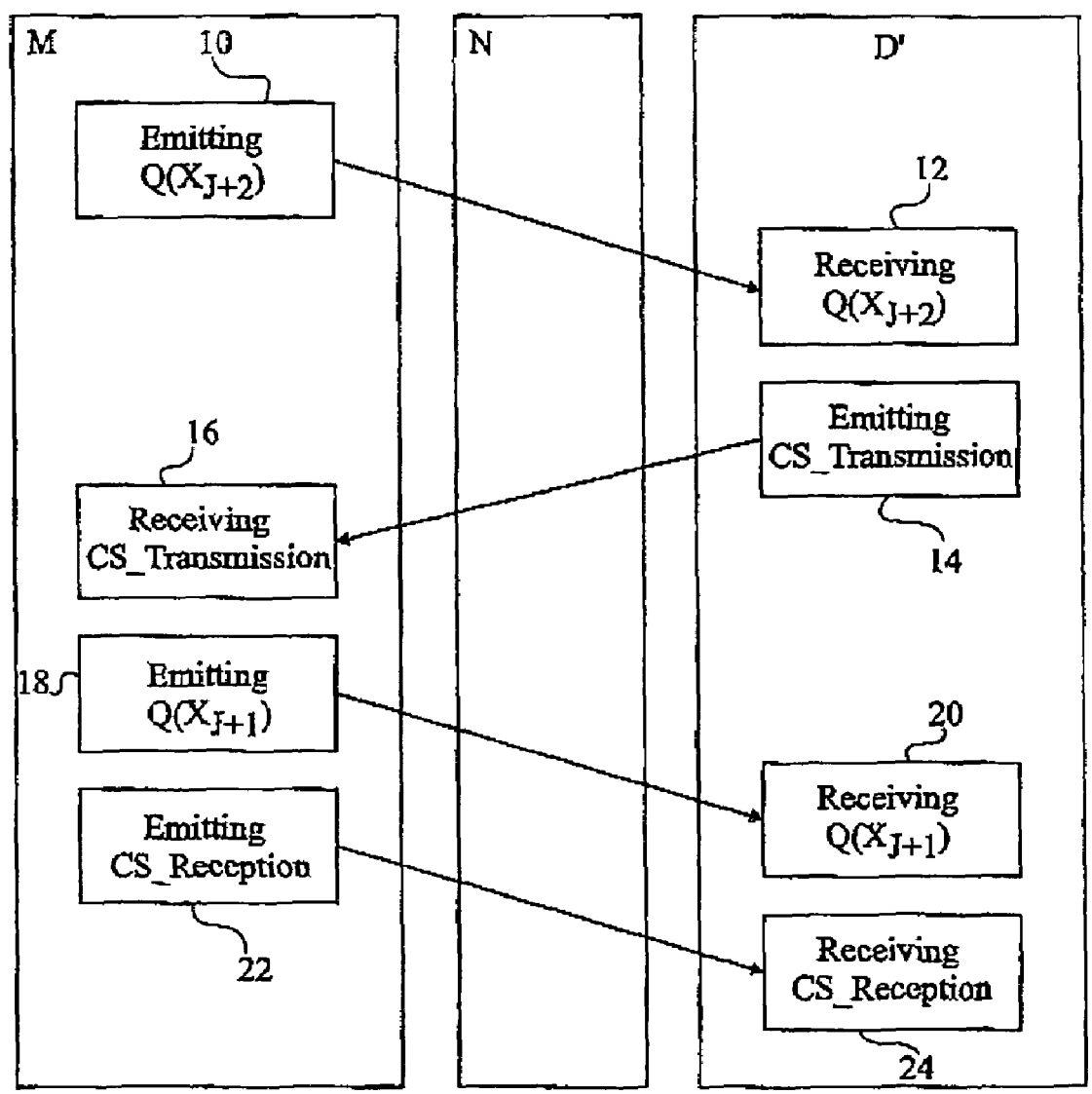
FIG. 4 schematically shows an example of implementation of the method of information frame exchange between a master device of the network and a new device connected to the network.

FIG. 4 shows an example of successive exchanges of information frames over network N between a master device M and a new device D' connected to network N.

The new device D' connected to network N has the architecture shown in FIG. 2. It thus comprises an address table, a direction table, a specific identification number U, and a privilege indicator P. According to the method of the present invention, the new device D' connected to network N transmits no information frame as long as it has not received an appropriate request transmitted by master device M.

For all the devices connected to network N, the direction indicators associated with addresses $X_{J+1}$ and $X_{J+2}$ are respectively at 0 and 1. The values of addresses $X_{J+1}$ and $X_{J+2}$ are for example FFFF and FFFE. Identification frame CS_Transmission associated with address $X_{J+2}$ especially comprises the set of addresses $X_1$ to $X_J$, the direction indicators associated with addresses $X_1$ to $X_J$, specific identification number U, and privilege indicator P.

At step 10, master device M transmits over network N a request $Q(X_{J+2})$ associated with address $X_{J+2}$. Such a request may be periodically transmitted.

At step 12, the new device D' and all the other devices already connected to network N receive request $Q(X_{J+2})$.

At step 14, the direction indicator associated with address $X_{J+2}$ being at 1, new device D' transmits identification frame CS_Transmission associated with address $X_{J+2}$.

At step 16, master device M receives frame CS_Transmission. The connection of a new device D' to network N is thus known by master device M, which determines based on frame CS_Transmission the address and direction tables and the value of the privilege indicator P of new device D'.

At step 18, master device M transmits a request $Q(X_{J+1})$ associated with address $X_{J+1}$.

At step 20, new device D' receives request $Q(X_{J+1})$. The direction indicator associated with address $X_{J+1}$ being at zero, new device D' starts waiting for an information frame coming from network N.

At step 22, master device M transmits a parameterizing frame CS_Reception that comprises an address table $X_1$ to $X_J$, a direction table, a privilege indicator value P, and which recalls the specific identification number U associated with new device D'. The tables and the privilege indicator may be modified with respect to the original values provided by identification frame CS_Transmission.

At step 24, new device D' and all the devices already connected to the network receive parameterizing frame CS_Reception. Only the communication unit PC of new device D' recognizes the specific identification number U present in frame CS_Reception. The address and direction tables and the privilege indicator of this new device are then modified according to the received frame CS_Reception. All the other devices already connected to the network and which also receive frame CS_Reception perform no action, since they do not recognize the specific identification number present in frame CS_Reception as being theirs. New device D' then inhibits address $X_{J+2}$ to no longer transmit an identification frame CS_Transmission if it subsequently receives a request $Q(X_{J+2})$ associated with address $X_{J+2}$. New device D' can then operate normally and transmit over network N information frames upon reception of requests from master device M. The present invention enables configuring a single new device D' at a time. Indeed, the duration of the configuration being very short, on the order of one microsecond, it is in practice impossible, on keying, to simultaneously connect two new devices on the network.

The privilege indicator P of a new device D' connected to the network is at 1 when new device D' has the possibility of behaving, under given conditions, as a master device, that is, of transmitting requests over network N. It may be useful for a slave device to have the possibility of becoming a master device, especially to overcome a deficiency of the active master device. When at step 16, master device M receives identification frame CS_Transmission and determines the value of privilege indicator P or new device D', it may decide to set the privilege indicator to 0 if it considers that the new device D' must not be able to operate as a master device or to leave the privilege indicator at 1 if it considers that, in certain operating cases, new device D' could be led to operate as a master device.

The present invention has many advantages.

First, it enables application systems of devices to exchange data over a network without knowing the network operating parameters. Indeed, the network operating parameters, which define the data flows between the devices connected to the network, are transmitted by the master device to each new device connected to the network.

Second, it enables rapidly detecting that a new device connected to the network operates "abnormally" in that the new device does not follow the data exchange process according to the present invention. Indeed, a new device according to the present invention connected to the network transmits no information frame as long as it has not received an appropriate request. A new "abnormally"-operating device connected to the network will probably transmit over the network from as soon as it is connected requests or information frames. There then immediately is a conflict between the master device and the new device. The transmission over the network of unwanted requests or information frames very rapidly causes a disturbance of the operation of the other devices connected to the network. Such a disturbance may generally be rapidly acknowledged by an exterior observer and the new device can then be removed from the network.

Third, a new device connected to the network must necessarily notify its presence by transmitting, responsive to a request of the master device, identification frame CS_Transmission. The master device may then modify the address tables of all the other devices already connected to the network to take into account the presence of the new device connected to the network. The method according to the present invention thus enables avoiding for a new device connected to the network to be "dormant", that is, to transmit no information frame over the network after its connection. The present method thus gives notice of the "awakening" of such a "dormant" device after an undetermined time, such an awakening up being likely to cause an alteration of the network operation, the cause of which could then be difficult to determine.

Fourth, the requests transmitted by the master device over the network may be formed of the mere addresses $X_1$ to $X_{J+2}$, which are for example formed of 16 bits. The size of the data transmitted over the network which are necessary to a proper network operation, but that thus contain no "useful" information, that is, information used by the application systems of the devices connected to the network, is thus limited.

Fifth, the communication unit of the communication circuit of the device can be formed with a simple logic gate architecture without requiring a microprocessor or a memory.

Sixth, it enables gathering the network operating parameters in a single location, for example, the master device, and thus enables global administration of the network from a central point.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for exchanging information frames over a network between a plurality of devices, each device of the plurality of devices comprising a communication circuit connected to a processing unit and comprising a plurality of addresses, each address being associated with one of a transmission indicator and a reception indicator but not both, wherein each address is associated with a memory containing an information frame that can be at least one of modified and read by the processing unit, wherein only a single device of the plurality of devices includes one of the plurality of addresses associated with the transmission indicator, and wherein all other devices of the plurality of devices that include the one address associate the one address with the reception indicator, the method comprising the steps of:
having a master device periodically transmit an address of the plurality of addresses over the network; and
responsive to transmission of the address by the master device:
having the communication circuit of the single device for which the address transmitted by the master device is associated with the transmission indicator transmit the information frame contained in the memory associated with the address over the network and provide its processing unit with an identifier of the address; and
having the communication circuit of each device for which the address transmitted by the master device is associated with the reception indicator write into the memory associated with the address the information frame transmitted over the network by the single device and provide its processing unit with an identifier of the address.

2. The method of claim 1, wherein the processing units of each of the plurality of devices, except for the processing unit of the master device, can neither read nor modify the plurality of addresses and the transmission and/or reception indicators of the communication circuit to which they are connected.

3. The method of claim 1, wherein all communication circuits further comprise a first address identical for all devices and associated with a transmission indicator and a second address identical for all devices and associated with a reception indicator, the connection of a new device to the network comprising the steps of:
having the master device periodically transmit the first address;
having the communication circuit of the new device, upon reception of the first address, transmit an identification frame;
having the master device successively transmit the second address and a parameterizing frame based on the identification frame; and
having the communication circuit of the new device, upon successive reception of the second address and of the parameterizing frame, modify its addresses and reception and/or transmission indicators based on the parameterizing frame.

4. The method of claim 3, wherein each device of the plurality of devices comprises a specific identification number stored in the communication circuit of the device, the identification frame transmitted by the communication circuit of the new device comprising the specific identification number of the new device, the parameterizing frame transmitted by the master device comprising the specific identification number of the new device.

5. The method of claim 3, wherein the communication circuit of the new device transmits no data as long as it has not received the first address.

6. The method of claim 3, wherein the communication circuit of each device comprises a privilege indicator at a first value when the device is capable of transmitting addresses over the network and at a second value otherwise, said privilege indicator being set to the first or to the second value by the communication circuit of the new device based on the parameterizing frame.

* * * * *